United States Patent [19]

Lewin

[11] Patent Number: 5,424,344
[45] Date of Patent: Jun. 13, 1995

[54] FLAME RETARDANT POLYAMIDE COMPOSITIONS

[75] Inventor: Menachem Lewin, Jerusalem, Israel

[73] Assignee: E. I. DuPont de Nemours and Company, Wilmington, Del.

[21] Appl. No.: 177,883

[22] Filed: Jan. 5, 1994

[51] Int. Cl.$^6$ .................. C08K 5/46; C08K 5/43; C08K 5/41

[52] U.S. Cl. ..................... 524/83; 524/157; 524/156; 524/159; 524/168; 524/169; 524/405; 524/419; 524/423; 524/432

[58] Field of Search ............... 524/405, 432, 419, 423, 524/83, 157, 156, 159, 168, 169; 564/82, 79; 549/18

[56] References Cited

U.S. PATENT DOCUMENTS

| | | | |
|---|---|---|---|
| 2,912,393 | 11/1959 | Stilbert | 524/157 |
| 2,912,394 | 11/1959 | Stilberg | 524/157 |
| 2,935,471 | 5/1960 | Aarons et al. | 524/419 |
| 3,475,364 | 10/1969 | Trapasso | 524/83 |
| 3,915,931 | 10/1975 | Gilleo et al. | 524/168 |
| 3,919,167 | 11/1975 | Mark | 524/83 |
| 3,931,081 | 1/1976 | Dany et al. | 524/168 |
| 3,951,910 | 4/1976 | Mark | 524/159 |
| 4,197,235 | 4/1980 | Nield et al. | 524/100 |
| 4,239,678 | 12/1980 | Williams | 524/159 |
| 4,254,015 | 3/1981 | Thomas et al. | 524/168 |
| 4,380,598 | 4/1983 | Robeson et al. | 524/157 |
| 4,455,396 | 6/1984 | Al-Tabaqchali et al | 524/157 |
| 4,600,741 | 7/1986 | Aycock et al. | 524/139 |
| 4,837,258 | 6/1989 | Laughner et al. | 524/169 |
| 4,866,114 | 9/1989 | Taubitz et al. | 524/100 |
| 4,888,370 | 12/1989 | Freitag et al. | 524/100 |
| 4,894,402 | 1/1990 | Abolins et al. | 524/157 |
| 4,981,895 | 1/1991 | Buchert et al. | 524/405 |
| 5,071,894 | 12/1991 | Weil | 524/405 |
| 5,102,931 | 4/1992 | Fuhr et al. | 524/405 |
| 5,151,462 | 9/1992 | El-Hibri et al. | 524/405 |
| 5,264,474 | 11/1993 | Schleifstein et al. | 524/169 |

FOREIGN PATENT DOCUMENTS

WO86/04911  8/1986  WIPO ................ 524/159

Primary Examiner—Veronica P. Hoke
Attorney, Agent, or Firm—Sprung Horn Cramer & Woods

[57] ABSTRACT

A flame retardant polymer composition comprising at least one polymer selected from the group consisting of a polyamide, polyolefin, polyester, polyacrylic, polystyrene, polyurethane and polycarbonate, a flame retardant effective amount of an additive comprising at least one (a) hexavalent oxygenated sulfur compound and optionally at least one of
(b) a char forming agent,
(c) a metal compound,
(d) a filler or reinforcing agent, and
(e) a flow modifier.

By excluding halogens and phosphorus beneficial results are achieved without the negative consequences attending their presence.

23 Claims, No Drawings

FLAME RETARDANT POLYAMIDE COMPOSITIONS

The present invention relates to the flame retardation of polymers with particular regard to non-halogen and non-phosphorus-based flame retarding materials.

Flame retardation (FR) of polymers is at present mandatory for many of their applications, due to strict laws and regulations in many countries. Accordingly, many systems for rendering various plastics flame retardant have been developed. These systems involve mixing or blending the plastic materials with one or more additives, e.g. flame retarding chemicals. Most of these chemicals are either based on halogens or on phosphorus, and constitute, in most cases, low molecular weight compounds. They are sometimes applied in conjunction with co-additives: synergists, such as antimony oxide, which is added to halogen derivatives, and nitrogen compounds, added to phosphorus flame retardants. The halogen-based additives, while providing a reasonable degree of fire safety, suffer from a number of inadequacies: they generate corrosive hydrogen halides and smoke upon combustion and they are suspected of emitting highly toxic substances. High loading of the halogen-based flame retardant are usually needed, which impact the desirable physical properties of the polymer.

Similarly, phosphorus derivatives are used in relatively high loadings since in many cases, such as in polyamides, their effectiveness is relatively low. They may also cause plasticization and degradation. Red phosphorus, in particular, which is used for polyamides, can cause the emission of the undesirable phosphine during and after processing.

Due to the high amounts of the above-mentioned additives required for effective flame retardation, the cost of treatment is relatively high.

An important development in flame retardancy of polymers was based on the principle of intumescence. It employs ammonium polyphosphaste (APP), which is blended with coadditives, a charforming material, usually a polyhydric alcohol such as pentaerythritol (petol) and a nitrogen derivative, such as melamine, guanidine or urea as a blowing agent, producing non-combustible gases. The APP is believed to serve as a dehydration catalyst of the polyhydric alcohol, creating double bonds, which later crosslink and produce a char network. The gases evolve from the simultaneously decomposing nitrogeneous blowing agent, expand and swell the crosslinked structure containing the plastic, the crosslinked petol and APP.

While the catalytic action of the APP has not been completely elucidated, it is believed that the hydroxyl groups in the petol as well as the hydroxyl groups formed on the methylenic segments of the polymer by oxidation with air during combustion are being phosphorylated and subsequently dephosphorylated, thereby casing dehydration. This process is not very efficient, since relatively large quantities are usually required.

Surprisingly, it has been found, and this is the objective of this invention, that a very high degree of flame retardance can be obtained by applying oxygenated hexavalent sulfur derivatives instead of phosphorus derivatives for flame retarding polymers, in particular polyamides. These derivatives are less toxic, less corrosive and considerably less expensive than halogen and P compounds. In this invention, the sulfur derivative serves as the catalyst in an intumescent system, which also includes a char-forming agent and other necessary ingredients, depending on the polymeric system.

The catalytic effect of the hexavalent sulfur derivative might consist of the sulfation of the hydroxyl groups and subsequent desulfation, thereby affecting a dehydration, double bond formation and crosslinking.

This invention aims at the flame retardation of thermoplastic polymers by non-halogen and non-phosphorus compounds. It is centered on the surprising discovery that hexavalent sulfur derivatives are highly effective in flame retardation of a large range of thermoplastic polymers. Among these polymers are polyamides, polyolefins, polyesters, polyacrylics, polystyrenes, polyurethanes, polycarbonates, and polymer blends. The present invention is especially useful for polyamides, such as nylon 6, nylon 66, nylon 11, nylon 12, nylon 4.4, nylon 6.3, nylon 6.4, nylon 6.10 and nylon 6.12. These polyamide names are well known in the scientific world, and defined, for instance, in the article on polyamides in the Encyclopedia of Polymer Science and Engineering, 2nd edition.

The hexavalent sulfur derivatives for use as additives in the present invention can be inorganic or organic derivatives of sulfuric and sulfamic acids. Among these materials are sulfamic acid salts, $H_2NSO_3$ Metal, condensation products of sulfamic acids, such as imidobisulfonic acid, $NH(SO_3H)_2$ and its salts, such as mono- and di-ammonium salts, alkali metal salts, alkaline earth and other divalent and multivalent metal salts. The invention also includes aliphatic and aromatic sulfamides, such as sulfamide (I), imidosulfamide (II), substituted sulfamides (III) in which the R, $R^1$, $R_2$, $R_3$ and $R_4$ can be different aliphatic or aromatic groups, condensation products of sulfimides with aldehydes (IV) and cyclic tri-sulfamides (V). Advantageously the various R radials are $C_{1-6}$-alkyl, phenyl or naphthyl, each optionally substituted by any halogen-free moiety. In addition, the invention includes sulfate esters of alcohols of the type of $ROSO_3$ and cyclic sulfates, such as VI, VII and VIII from mono- and poly-pentaerythritol, IX, similar sulfate esters of 1,4-anhydrosorbitol (X) and 1,4-anhydromannitol, XI, -γ-sultones such as XII and XIII, and substituted -γ-sultanes.

$NH_2SO_2NH_2$     I

$(NH_2SO_2)_2NH$     II

$R_1R_2NSO_2NR_3R_4$     III

$[RCH(CH)NH]_2SO_2$     IV

V

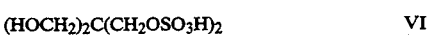

$(HOCH_2)_2C(CH_2OSO_3H)_2$     VI

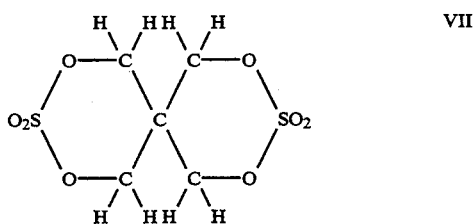

VII

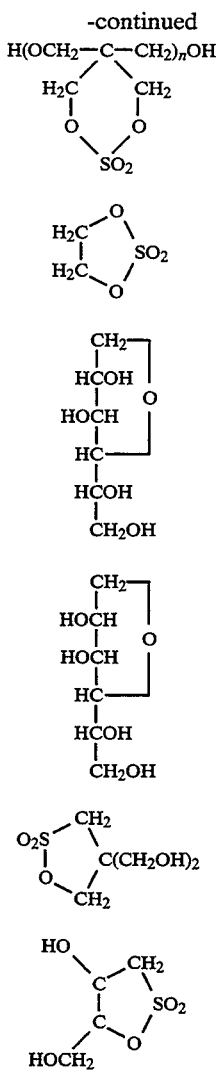

VIII
IX
X
XI
XII
XIII

Whereas all the above materials included in the invention share the ability to bring about dehydration of polymers at combustion temperatures, they differ in their properties, such as solubility, hygroscopicity, molecular weight, thermal stability, volatility and other properties, depending on their structure. It is therefore possible according to the invention to adapt hexavalent sulfur derivatives to polymers possessing a wide variety of properties especially that of varied processing temperatures.

The preferred materials for additives in this invention are the salts of the imido-bisulfonic acid and especially the diammonium imido-bi-sulfonate (DIBS), $NH(SO_3NH_4)_2$, which is prepared from ammonium sulfamate by vacuum heating at 200° C. Surprisingly, it has been found that this compound is particularly suitable and highly effective for flame retardancy of polyamide 6 and 66, as shown in the examples below. The desirable feature of DIBS, in addition to its FR effect, is its relatively high heat stability. In thermogravimetric measurements it was found that the onset of its decomposition is above 310° C., and it is therefore possible to use it both for nylon 6, which is processed at 240° C., and for nylon 66, which is processed at 280° C., as well as for other nylons and other polymers which are processed at a range of temperatures from 140°–310° C.

The amounts of additive (a) for use in the invention depends on the nature of the polymer, on its processing temperature and on the degree of flame retardancy desired and the nature and amounts of the additives (b) and (c). They range from 0.1 to 40 wt. % of the composition. Higher amounts are needed for polymers with lower melting points than for polymers of higher melting points. For example, for nylon 6, higher amounts of DIBS are required than for nylon 66. In the presence of fillers, such as glass fibers compounded with the polymer, different amounts of additive (a) are needed than without the filler, the amount depending on the nature and wt. % of the filler, and can be easily determined by those skilled in the art.

The flame retarding effect of di-ammonium imido-bisulfonate and the other materials listed above on thermoplastic polymers has not been hitherto described in the technical literature and is disclosed here for the first time.

Another basic feature of this invention is that the hexavalent sulfur compound can be an effective flame retardant by itself; however, it is preferably applied together with a char-forming agent, additive (b), such as pentaerythritol and its oligomers, or other polyhydric alcohols, such as glycols and their derivatives, mannitol, sorbitol and other three, four, five and six-membered sugar molecules and other derivatives. One may also use polymeric carbohydrates such as starch, xylans, mannans and other hemicelluloses derived from wood and other plants, which are commercially available.

In this invention, it is sometimes advisable to combine the sulfur derivative and the char-forming agent in one molecule. Such compounds, for example are prepared by esterifying, or otherwise combining, one or more hydroxyls in pentaerythritol with sulfates, sulfamates, sulfamides, sulfimides or imido-sulfamates. Several such materials are, for example, VI, VII, IX, XII, as well as XIII.

Polyhydric alcohols are not the only char-forming agents used in the present invention. Polyphenylene oxide (PPO) and polyphenylene sulfide (PPS) have been also surprisingly found highly suitable char-forming agents in conjunction with the hexavalent sulfur derivatives. Advantageously the range in mw from about 2,000 to 10,000. Blends of PPO with polyamides are well known ad are described for example by Aycock, U.S. Pat. No. 4,600,741 and [INCOMPLETE] a flame retarding component in low amounts in polyamides, as taught by Freitag in U.S. Pat. No. 4,888,370 (1989). Only a very low degree of flame retardancy, however, has been achieved by this component alone. It has been found, for example by Taubitz, et al, U.S. Pat. No. 4,866,114 (1989) that high oxygen indices can be achieved only when applied together with phosphorus or halogen derivatives.

PPO and PPS are very stable at the processing temperatures of polyamides. They have aromatic rings on the backbone. They are virtually free of volatile components at the polymer processing temperatures. The molecular weight of PPO and PPS can be between 2,000 and 100,000. It is not critical since these materials flux easily with the polyamide during blending. Other polymers to be used as char-forming agents in the invention include aromatic polysulfides, polysulfones, polyketones, polyimides, polyetherimides and polyarylates.

The preferred aromatic char-forming agents for the invention are PPS and PPO. High or low molecular weight polymers can be used in the invention. The char-forming agents can be applied in the form of powder, granules, flakes, beads or diced cubes.

The amounts of additive (b), such as pentaerythritol or PPS to be used in the invention is about 0.0% to 50%, preferably from 0.5% to about 40%. It will be evident to those skilled in the art of polymer compounding and flame retardancy that the exact amount will depend on the polymeric system and on the degree of flame retardancy required. The amount of (b) is to be adapted to the amount of (a).

The metal compounds for use as additive (c) in the invention comprise oxides and salts of alkali, alkaline earth, divalent and multivalent metals. One or several such compounds may be used together in the invention, depending on the nature of the polymeric system and according to the function required. It is believed that there are three major functions which the metal compounds may fulfill in the invention:

A. Regulation of the acidity of the composition during processing, storage and combustion. The additive (a) releases a relatively strong acid which may degrade the polymer excessively and bring about a deterioration of its physical properties and a decrease in molecular weight, which increases its flammability. Whereas a limited degree of degradation is needed during the combustion to facilitate the dehydration and the crosslinking, excessive degradation is detrimental. It has surprisingly been found that zinc oxide as additive (c) can counteract this excessive degradation by buffering the system and regulating the acidity. The identity of the metal oxide and its concentration are most important and have to be strictly regulated. An excess in the (c) concentration may decrease the effectiveness of additives (a) and (b). If the concentration is too low, a degradation is perceived. It has further surprisingly been discovered that a similar effect can be obtained by adding, instead of (c), a basic nitrogen derivative, such as melamine, which presumably performs the same buffering function. It can be seen by comparing Examples 14, 15 and 16 hereinbelow. Thus it is clear that melamine may be optional for the invention, but it is not essential.

B. A char stabilizing effect. The integrity and mechanical strength of the char is known to contribute greatly to flame retardancy. The char has to perform the function of a barrier to the passage of flammable gases and molten mass out of the polymer and to the transfer of heat from the flame to the polymer. Low melting glasses such as zinc borate have been used as a flame retardant and smoke suppressant additive in conjunction with halogen for polyvinyl chloride [see R. E. Meyers et al, J. Fire Sci. (1985) 3, 415–431]. It has also been disclosed as a component in conjunction with magnesium hydroxide for PE (Nakagoma et al, Jap. Pat. No. 02,150,436) and with triphenyl phosphate for polycarbonate (Watanabi, J. European Pat. Appl. 0520186 A1 (1992). Zinc borate has up to now not been disclosed as a component in a sulfur-based flame retardant composition. According to the present invention, zinc borate can serve in a dual capacity: a char-stabilizer and a buffer.

The low melting glasses according to the invention comprise borates of manganese, iron and preferably zinc, for example $Zn_2B_4O_2$, $ZnB_2O_4$ or $ZnB_4O_4$. Other low-melting glasses are, for instance, lead borate glass and alkali phosphate glass with melting points of 200°–600° C. and preferably 300°–500° C. They are commercially available as solder glasses, frits and glazes. Such glasses include those described by R. E. Meyers (see above) and incorporated by reference in its entirety herein. Borophosphates are also included in these glasses.

c. The third function of the additive (c) is as crosslinking catalyst. Many metallic compounds are known to catalyze crosslinking, as described by Petersen in Handbook of Fiber Science and Technology, Vol. II, Chemical Processing of Fibers and Fabrics, Part A, Functional Finishes, M. Lewin and S. B. Sello, editors, Marcel dekker, Publishers, pages 205–210 (1983). The preferred catalysts for the invention are magnesium hydrogen phosphate, zirconium oxide or titanium oxide. Whereas the above crosslinking agents are a part of the invention, their use is optional.

Additive (c) can be composed of one, two or three of the above-mentioned materials.

The amounts of additive (c) applied according to the invention are 0.0 to 40 wt. % of the composition. It will be evident to those skilled in the art that the amount will vary according to the polymer system and to the degree of flame retardance desired, and for a given level of flame retardancy the composition of (c) can be varied and its amount can be lower as the amount of (a) and (b) is higher, and conversely. The amount of the thermoplastic polymer is at a minimum 20% by weight of the total composition.

The polymer mixtures of the invention may also include additive (d) such as reinforcing agents and fillers: glass fibers, mineral fibers, carbon fibers, aramide fibers, talc, mica, gypsum, wollastonite, etc. They may also include pigments, stabilizers, processing aids, coupling agents, lubricants, mold-release agents, electro-conductive additives and impact modifiers.

The polymer mixtures may also include, according to the invention, flow modifiers (additive e) such as Teflon (polytetrafluoroethylene) powder. The amounts of the powdered Teflon may vary from 0.0 to 3 wt. % of the composition.

Other flame retardants such as phosphorus- and halogen-containing agents can be present in the composition and they contribute partly to the flame retardance of the polymers. However, an important advantage of the present invention is that no halogenor phosphorus-based flame retardant additives are needed for obtaining a very high degree of flame retardancy, which are expressed in LOI values above 30 and UL94 rating of VO.

The mixing and blending of the ingredients of the invention can be carried out by any method suitable for obtaining uniform dispersions of particulate solids, such as mixing in the Brabender mixer or in an extruder.

EXAMPLES

The present invention is further illustrated, but not limited to, the following examples.

Varying amounts of ingredients (a), (b) and (c) were admixed with the powdered polymer in a Brabender mixer of 240 grams capacity for a time and at a temperature dependent upon the polymer used, at 40 rotations per minute. Samples were prepared by compression molding in a hot press at a temperature dependent on the polymer used, cooled to room temperature and cut to standard test pieces. The mixing and compression molding for nylon 6 was 240° C. and the time of mixing was 4 minutes. For nylon 66, the time of mixing was 5 minutes, the temperature was 270° C. The nylon used was commercial-grade powder, produced by Phone Poulenc, France.

The flammability was tested by the limiting oxygen index (LOI) method, according to ASTM D-2863 and by UL (Underwriters Laboratories) 94 configuration-bottom ignition by a standard burner flame for two successive 10-second intervals, with averaging of the afterflame time. Ten test pieces were tested and the burning times given in each example are averages of all ten test pieces.

The DIBS used in most examples is diammonium imido bisulfonate. It was prepared by vacuum heating at 200° C. of ammonium sulfamate. Its formula is $NH(SO_3NH_4)_2$.

TABLE 1(4)

| Example No. | (a) Identity | wt. % | (b)(1) wt. % | (e)(2) wt. % | LOI | UL-94 | Burning(3) time sec. |
|---|---|---|---|---|---|---|---|
| 1 | DIBS(5) | 7.5 | 3 | 0.3 | 29.7 | VO | 0.6 |
| 2 | DIBS | 10 | 1 | 0.3 | 28.3 | VO | 0.4 |
| 3 | DIBS | 10 | 6 | 0.3 | 31.2 | VO | 0.7 |
| 4 | DIBS | 7.5 | 5 | 0.5 | 32.0 | VO | 0.5 |
| 5 | DIBS | 5 | 7 | 1.0 | 32.3 | VO | 0.4 |
| 6 | | | 7 | 0.5 | 23.2 | | Burns |
| 7 | DIBS | 12.5 | | 0.3 | 23.9 | | Burns |
| 8(5) | melamine sulfate | 10 | 3 | 0.3 | 23.8 | | Burns |
| 9(6) | melamine + ammonium sulfamate, 1:1 | 10 | none | none | 25.6 | | Burns |
| 10(7) | DIBS + melamine | 7.5 | 3 | 0.3 | 29.0 | VO | 1.0 |
| 11(8) | DIBS + melamine cyanurate | 7.5 | 3 | 0.3 | 25.7 | | Burns |
| 12 | DIBS | 7.5 5 | 5 | 0.3 | 30.6 | VO | 0.8 |

(1)Compound (b): char forming agent-pentaerythritol.
(2)Compound (e) flow modifier-Teflon powder, produced by Du Pont.
(3)Burning time in seconds: average after burning time of 10 test specimens.
(4)Polymer used in all compositions: nylon 6, commercial powder, produced by Rhone Poulenc, France
(5)Melamine sulfate, prepared according to Example 5 in U.S. Pat. No. 4,197,235, April 8, 1980.
(6)Melamine + ammonium sulfamate, 1:1, preheated at 200° C. in vacuo.
(7)DIBS + malamine, 7.5% each.
(8)DIBS + melamine cyanurate, 7.5% each, Melamine and melamine cyanurate produced by Chemie Linz.

TABLE 2(4)

| Example No. | (a) Identity | wt % | (b)(1) wt. % | (c)(2) wt. % | (e)(3) wt. % | LOI | UL-94 | Burning time sec. |
|---|---|---|---|---|---|---|---|---|
| 13 | none | | 3 | none | 0.3 | 26.2 | | Burns |
| 14 | DIBS + melamine | 1.5 + 1.5 | 3 | none | 0.3 | 32.1 | VO | 0.8 |
| 15 | DIBS | 1.5 | 3 | 0.25 | 0.3 | 31 | VO | 1.0 |
| 16 | DIBS | 1.5 | 3 | 0.25 | none | 33.2 | VO | 0.6 |
| 17 | DIBS | 1.5 | 3 | 0.25 | 0.25 | 32.9 | VO | 1.0 |
| 18 | DIBS | 1.5 | none | 0.25 | 0.3 | 28.2 | | Burns |

(1)Compound (b): char-forming agent-pentacrithitol.
(2)Compound (c): metal compound: zinc oxide.
(3)Compound (e): flow modifier-Teflon powder produced by Du Pont.
(4)Polymer used in all compositions: nylon 6.6 commercial powder, produced by Rhone Poulenc, France.

TABLE 3(1)

| Example No. | (a) DIBS wt % | (b)(1), | wt. % | (c)(2), | wt. % | LOI | UL-94 | Burning time sec. |
|---|---|---|---|---|---|---|---|---|
| 19 | 7.5 | Petol(2) | 3 | none | | 24.2 | | Burns |
| 20 | none | none | | none | | 23.9 | | Burns |
| 21 | 18 | none | | ZnB(3) | 14 | 31.8 | VI | 9.2 |
| 22 | 19 | none | | ZnB | 16 | 33.9 | VI | 12.0 |
| 23 | 20 | none | | ZnB | 18 | 36.0 | VO | 0.0 |
| 24 | 16 | PPS(4) | 8 | ZnB | 8 | 31.6 | | 2.8 |
| 25 | 16 | PPO(5) | 8 | ZnB | 8 | 29.8 | | 2.7 |
| 26 | | | | ZnB | 18 | 23.0 | | Burns |

(1)The polymer used in all the above compositions was nylon 6 powder compounded with 25% glass fibers (compound (d).
(2)Petol: pentacrythritol.
(3)ZnB: Zinc borate, supplied by U.S. Borax Inc. as ZB Firebrake.
(4)PPS: polyphenylene sulfide; supplied by Phillips Petroleum.
(5)PPO: poly(2,6-dimethyl)phenylene oxide; supplied by the General Electric Co.

TABLE 4(1)

| Example No. | (a) DIBS, wt. % | (b)(2) | wt. % | (c)(3) | wt. % | LOI | UL-94 | Burning time sec. |
|---|---|---|---|---|---|---|---|---|
| 27 | 6 | PPS | 15 | Znb | 10 | 35 | VI | 16 |
| 28 | none | none | | none | | 26.4 | | Burns |
| 29 | 8 | PPS | 10 | ZnB | 15 | 34.2 | VI | 10 |

TABLE 4(1)-continued

| Example No. | (a) DIBS, wt. % | (b)(2) | wt. % | (c)(3) | wt. % | LOI | UL-94 | Burning time sec. |
|---|---|---|---|---|---|---|---|---|
| 30 | 6 | PPS | 7 | ZnB + MgHP(2) | 15 7 | 34.6 | VI | 18 |
| 31 | none | PPS | 7 | ZnB + MgHP | 15 7 | 26.4 | | Burns |
| 32 | 6 | PPS | 15 | ZNB + ZrO2(3) | 14 3 | 35.4 | | 20 |
| 33 | 6 | none | | ZnB | 14 | 27.9 | | Burns |

(1)The polymer used in all the above compositions was nylon 66 powder compounded with 25% glass fibers (compound (d)).
(2)Magnesium hydrogen phosphate, MgHPO4 (Aldrich).
(3)ZrO2-zirconium oxide powder (Aldrich).

Some comparative materials not within the invention are also included, viz. Examples 6, 7, 8, 9, 13, 20, 26, 28, and 31. It can be seen that no significant flame retardancy effect is obtained in the absence of additive (a). Example 7 shows that (a) without (b) or (c) is inadequate. Example 8 shows that melamine plus ammonium sulfamate without (b) is inadequate, although it shows an increased LOI. Comparing Examples 14, 15 and 16 show that the same wt. % of DIBS yields a similar result in the presence of melamine or when, instead of melamine, additive (c), e.g. ZnO, is added. This shows that the melamine is not needed for the performance of the invention, although it may be optionally used. Comparing examples 15 and 16, it can be seen that a high degree of flame retardance can be obtained without additive (e), and its use is optional.

Examples 21, 22 and 23 (see Table 3) show that a high degree of FR is obtained when only additives (a) and (c) are present in the case of glass fiber reinforced nylon 6, while additive (c) alone (Example 26) yields a very modest improvement.

It is clearly evident from the examples that, in order to perform the invention, it is essential to blend the polymer with (a) or with (a) and (b) or (a) and (c) or (a), (b) and (c), depending on the polymer mixture.

While only a few exemplary embodiments of this invention have been described in detail, those skilled in the art will recognize that there are many possible variations and modifications possible; many of the novel and advantageous features of the invention can be formed, Accordingly, it is intended that the following claims cover all such modifications and variations.

What is claimed is:

1. A thermoplastic flame retardant composition comprising particles of at least one thermoplastic polyamide, a flame retardant effective amount of an additive comprising at least one
   a. member selected from the group consisting of sulfamic acid, imido bisulfonic acid of the formula $NH(SO_3H)_2$, a mono- or di-ammonium or monovalent, di-valent or multi-valent metal salt of sulfamic acid or imido bi-sulfonic acid, sulfamide of the formula $H_2NSO_2NH_2$, aliphatic or aromatic-substituted sulfamide, a sulfate ester of a polydydric alcohol, an imidosulfonic acid ester of a polyhydric alcohol and a γ-sultone, and optionally at least one of
   b. a char forming agent,
   c. a metal compound,
   d. a filler or reinforcing agent, and
   e. a flow modifier.

2. A composition according to claim 1, wherein there is present a char forming agent (b) comprising polyphenylene oxide.

3. A composition according to claim 1, wherein there is present a char forming agent (b) comprising polyphenylene sulfide.

4. A composition according to claim 1, wherein (a) comprises di-ammonium imido bi-sulfonate.

5. A composition according to claim 1, wherein there is present a char forming agent (b) selected from the group consisting of a polyhydric alcohol, oligomeric polyhydric alcohol, substituted alcohol, esterified polyhydric alcohol, sugar and polysaccharide.

6. A composition according to claim 5, wherein the char forming agent (b) comprises pentaerythritol.

7. A composition according to claim 5, wherein there is present as a composite of (a) and (b) a sulfate ester or an imidosulfonic ester of pentaerythritol.

8. A composition according to claim 1, wherein there is present a char forming agent (b) which is an aromatic polymer having aromatic groups in the backbone selected from the group consisting of a polyphenylene oxide, polyphenylene sulfide, polyphenylene sulfone, polyarylate, polyimide and polyetherimide.

9. A composition according to claim 8, wherein there is present a char forming agent (b) comprising polyphenylene sulfide.

10. A composition according to claim 8, wherein there is present a char forming agent (b) comprising polyphenylene oxide.

11. A composition according to claim 1, wherein there is present a metal compound (c) selected from the group consisting of an oxide, borate, silicate, sulfamate, phosphate, silicate, zirconate, and titanate of an alkali, alkaline earth and di- or multi-valent metal.

12. A composition according to claim 11, wherein the metal compound is selected from the group consisting of zinc oxide, zinc borate, magnesium oxide, magnesium hydroxide, magnesium borate, magnesium hydrogen phosphate, magnesium di-hydrogen phosphate, zirconium oxide, titanium oxide, sodium fluozirconate, sodium fluotitanate, manganese oxide, manganese borate, vanadium oxide and vanadium borate.

13. A composition according to claim 11, wherein the metal compound comprises zinc oxide.

14. A composition according to claim 11, wherein the metal compound comprises zinc borate.

15. A composition according to claim 1, wherein there is present a filler or reinforcing agent (d) selected from the group consisting of glass fibers, carbon fibers, aramide fibers, thermotropic polyester fibers, mineral fibers, wollastonite, mica, gypsum, talc and a low temperature glass.

16. A composition according to claim 1, wherein there is present polytetrafluoroethylene powder as a flow modifier (e).

17. A composition according to claim 1, comprising by weight about at least 20% of polymer
(a) 0.1 to 40%
(b) 0 to 50%
(c) 0 to 50%
(d) 0 to 50% and
(e) 0 to 3%.

18. A composition according to claim 1, wherein the polyamide comprises at least one member selected from the group consisting of nylon 6, nylon 66, copolymers of nylon 6 and of nylon 66, blends of nylon 6 and 66, nylon 11, nylon 12, nylon 4.4, nylon 6.3, nylon 6.4, nylon 6.10, nylon 6.12 and nylon 4.6.

19. A composition according to claim 1, wherein the polyamide comprises nylon 66.

20. A composition according to claim 15, comprising by weight about at least 20% of polyamide,
(a) 0.2 to 30%
(b) 0 to 40% of a char forming agent selected from the group consisting of pentaerythritol, polyphenylene oxide and polyphenylene sulfide,
(c) 0 to 40% of a metal compound selected from the group consisting of zinc oxide, zinc borate, magnesium hydrogen phosphate, zirconium oxide and titanium oxide,
(d) 0 to 40% of a reinforcing agent selected from the group consisting of glass fibers, aramide fibers, inorganic powders and inorganic fibers, and
(e) 0 to 1% of polytetrafluoroethylene powder.

21. A composition according to claim 1, wherein (a) is a cyclic sulfate ester.

22. A composition according to claim 1, wherein (a) is a $\gamma$-sultone substituted by at least one of hydroxy and hydroxyalkyl.

23. A thermoplastic flame retardant composition comprising at least one thermoplastic polyamide, a flame retardant effective amount of an additive comprising at least one
   a. member selected from the group consisting of sulfamic acid, imido bi-sulfonic acid of the formula $NH(SO_3H)_2$, a mono- or di-ammonium or monovalent, di-valent or multi-valent metal salt of sulfamic acid or imido bi-sulfonic acid, sulfamide of the formula $H_2NSO_2HN_2$, aliphatic or aromatic-substituted sulfamide, a sulfate ester of a polyhydric alcohol, an imidosulfonic acid ester of a polyhydric alcohol and a $\gamma$-sultone, and at least one of
   b. a char forming agent,
   c. a metal compound,
   d. a filler or reinforcing agent, and
   e. a flow modifier.

* * * * *